Dec. 7, 1937.  L. B. McGUIGAN  2,101,744
VEHICLE WHEEL
Filed Oct. 24, 1935  3 Sheets-Sheet 1

Inventor:
Louis B. McGuigan
By Clarence A. O'Brien
Hyman Berman Attorneys

Dec. 7, 1937.  L. B. McGUIGAN  2,101,744
VEHICLE WHEEL
Filed Oct. 24, 1935  3 Sheets-Sheet 2

Inventor:
Louis B. McGuigan
By Clarence A. O'Brien
Hyman Berman
Attorneys

Dec. 7, 1937.   L. B. McGUIGAN   2,101,744
VEHICLE WHEEL
Filed Oct. 24, 1935   3 Sheets-Sheet 3
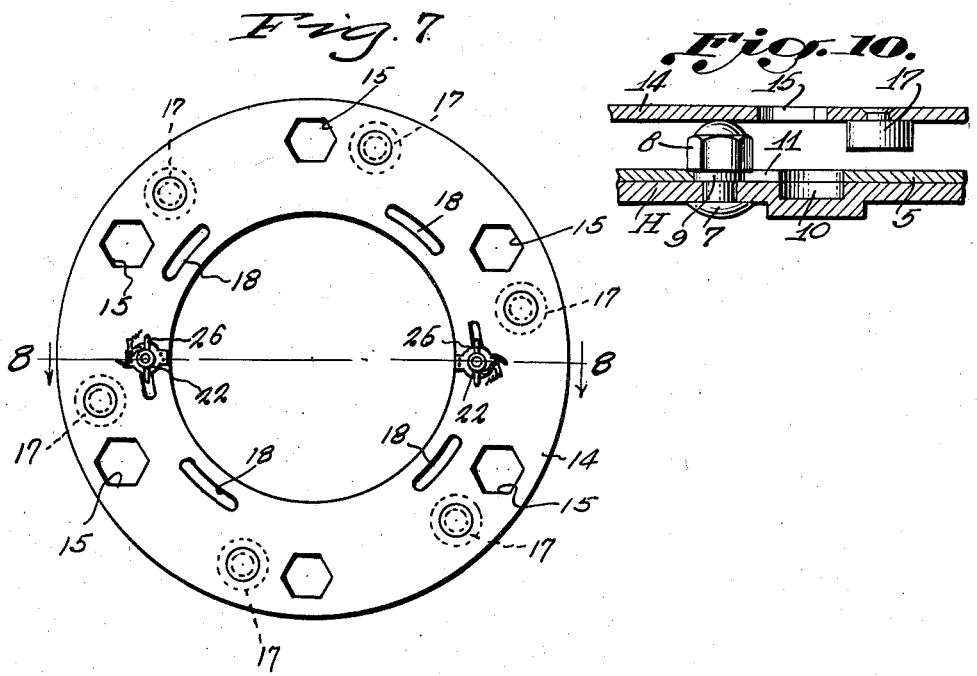
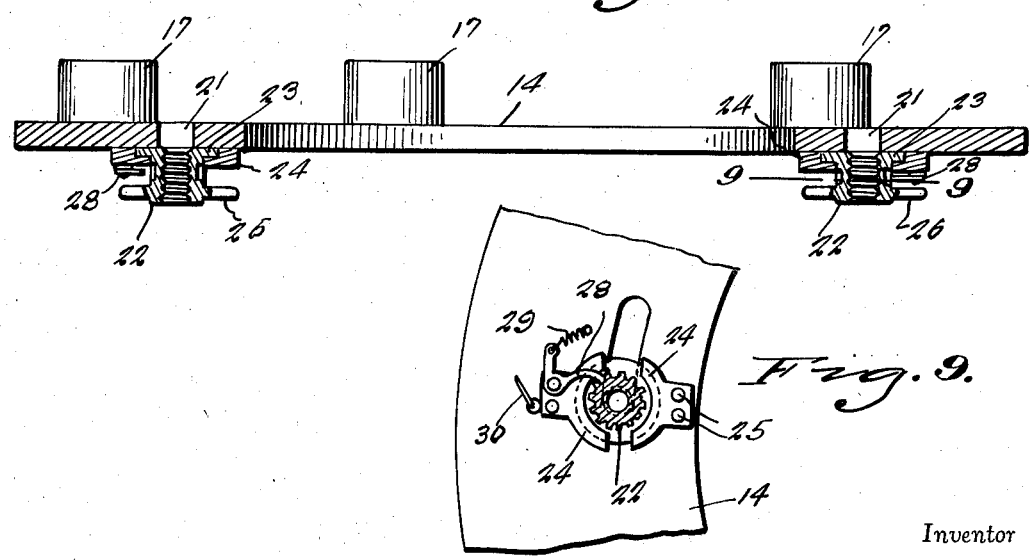
Inventor
Louis B. McGuigan
By Clarence A. O'Brien
Attorney Patented Dec. 7, 1937

2,101,744

UNITED STATES PATENT OFFICE 2,101,744

VEHICLE WHEEL

Louis B. McGuigan, Bryn Mawr, Pa.

Application October 24, 1935, Serial No. 46,613

5 Claims. (Cl. 301—9)

This invention relates to vehicle wheels and more particularly to wheel structures of the type particularly adapted for use on automobiles.

The invention resides in the provision of a demountable wheel characterized by efficient means whereby the wheel may be easily and quickly mounted on or demounted from an inner hub as the case may be.

The invention together with its objects and advantages will be best understood from a study of the following description taken in connection with the accompanying drawings wherein:

Figure 7 is an elevational view of the locking plate.

Figure 8 is a detail view taken substantially on the line 8—8 of Fig. 7.

Figure 9 is a detail view taken substantially on the line 9—9 of Fig. 8.

Figure 10 is a fragmentary detail sectional view through a portion of the inner hub of the vehicle wheel, the shell portion of the outer hub, and the locking plate in the region of a pocket in the inner hub, a key hole slot in the shell portion of the outer hub and an adjacent bolt and lug, and showing the locking plate in a substantially unlocked position.

Figure 1:
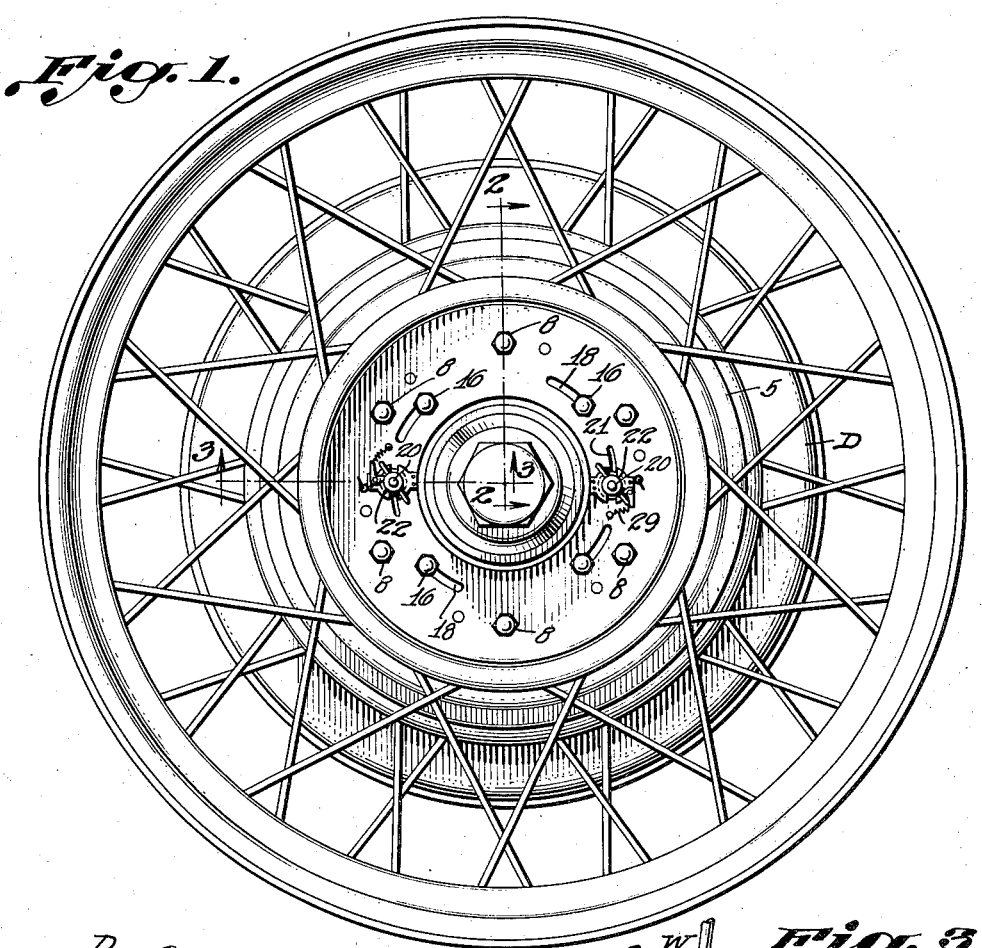
Figure 1 is an elevational view of the outboard side of the wheel embodying the features of the present invention.
Figure 2:
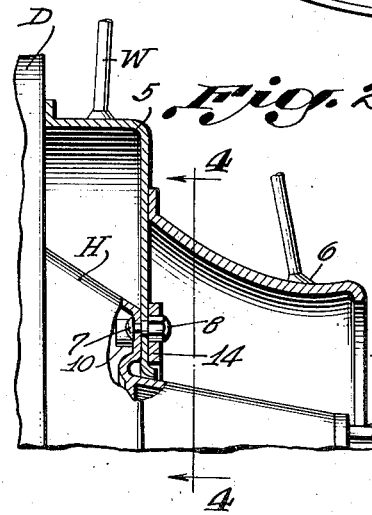
Figure 2 is a detail sectional view taken substantially on the line 2—2 of Fig. 1.
Figure 3:
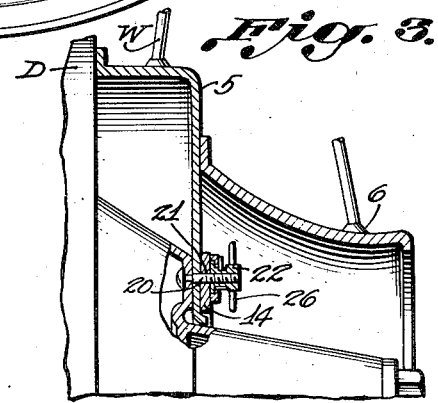
Figure 3 is a view taken substantially on the line 3—3 of Fig. 1 with the hub omitted.
Figure 4:
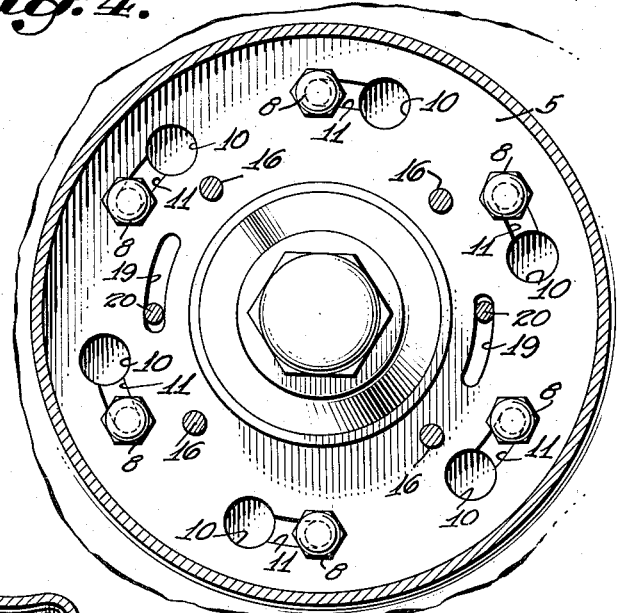
Figure 4 is a detail view taken substantially on the line 4—4 of Fig. 2.

Referring to the drawings by reference numerals it will be seen that D indicates a portion of a brake drum to which is fixed the inner hub H of a vehicular wheel, of the wire spoke type, and designated generally by the reference numeral W. The outer hub of the wheel and to which the spokes of the wheel, at one end are secured, include a circular flanged section 5 housing the inner hub H and a smaller section 6 housing the axle spindle.

In accordance with the present invention bolts 7 extend outwardly from the hub section H through openings suitably provided in said hub section and threadedly engaged with the bolts 7 are nuts 8 that have reduced portions 9. Also, the hub section H adjacent each bolt 7 is formed to provide a pocket or recess 10.

The shell portion 5 of the outer hub is provided with an annular series of spaced keyhole slots 11, one for each nut 8 and pocket 10. Thus, for example, in mounting the wheel in place, the nuts 8 are first received in the enlarged portion of the keyhole slots 11 and the hub portion 5 is then rotated in one direction relative to the hub section H so that the narrow portions of the slot engage the inner reduced end of the nut for securing the wheel in place. To remove the wheel the operation is exactly the reverse to that just described with regard to the mounting of the wheel.

An annular locking plate 14 is provided, and is cooperable with the hub section H for locking the inner end outer hub sections of the wheel together.

The plate 14 is provided with a circular series of spaced openings 15 which, as shown, are hexagonal, and are adapted to receive hexagonal portions of the nuts 8.

The plate 14 on one side thereof and in proximity to the openings 15 is provided with lugs 17 which, when the hub sections of the wheel are in final locked position, are received in the recesses 10 through the enlarged end of the slots 11.

Also detachably mounted on and screw threadedly engaged with the hub section 5 are headed studs 16 which serve to secure the locking plate 14 in mounted position and which are threadedly engaged with the shell 5 of the hub incidental to the mounting thereon of the locking plate 14, the studs 16 being accommodated by openings 18 provided therefor in the locking plate. The openings 18 as best shown in Figure 7 are in the form of arcuate slots so as to permit a shifting of the locking plate 14 relative to the shell section 5 of the hub for locking or releasing the wheel; the bolts 16 and slots 18 also serve as a medium for retaining the hub shell 5 and the locking plate 14 associated with one another at all times to prevent loss or misplacement of the locking plate.

The wheel structure as above described is more fully completely set out and claimed in Patent No. 2,008,330 granted to me under date of July 16, 1935, and entitled "Automobile wheel".

The present application is particularly concerned with improved means for positively securing the locking plate 14 in position and the provision of such means may be also utilized in the nature of handle means to facilitate proper placement and displacement of the locking plate 14 incidental to a mounting or demounting of the wheel.

Thus in accordance with this invention the hub section H is provided with diametrically disposed pins 20 having reduced ends threadedly engaged with said hub section.

To accommodate the pins 20 hub section 5 is provided with slots 19 and the locking plate 14 is provided with arcuate slots 21, and positioned adjacent each slot 21 is a nut 22 that has a swivel connection with the plate 14, this connection being provided through the medium of a flange 22 on one end of the nut engaged by arcuate jaw members 24 arranged in pairs and secured to the plate 14 at opposite sides of the slot 21 in any suitable manner as indicated generally at 25. Thus it will be seen that the nut 22 is mounted on the plate for rotative movement and thereby is readily threadedly engaged with the stem 20 for drawing the plate 14 into final locking position. To facilitate the threading or unthreading of the nut 22 relative to its pin 20 said nut is provided with suitable handle means 26.

Also to secure the nut 22 against casual unthreading said nut, intermediate its ends is provided with a series of ratchet teeth 27 formed on the periphery thereof and normally engaged by dog 28 pivotally mounted on one of the jaws 24 and normally urged into engagement with the ratchet teeth through the medium of a spring 29.

For releasably holding the dog 28 out of engagement with the ratchet teeth to thereby permit an unscrewing of the nut 22 there is also provided a suitable keeper hook 30 that may be readily engaged with the end of the dog 28 connected with the spring 29 when the dog has been swung out of engagement from the teeth 27.

Figure 5:
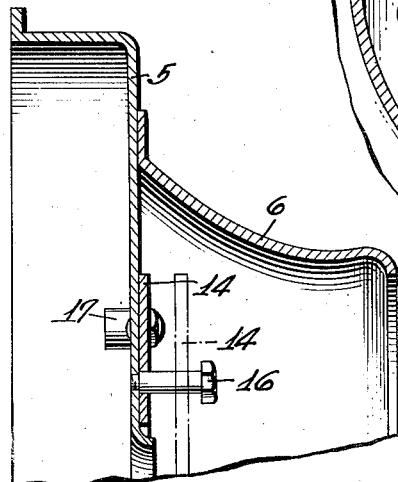
Figure 5 is a fragmentary detail view illustrating the locking plate in an unlocked position.
Figure 6:
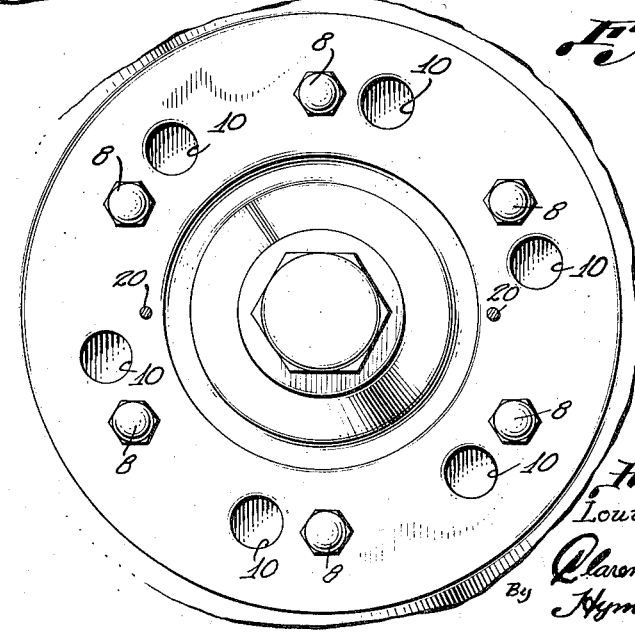
Figure 6 is a detail elevational view of the inner hub.

From the above it will thus be seen that to mount the wheel the hub shell 5 is first positioned to aline the largest ends of the slots 11 with the bolts 8, whereupon the bolts 8 are received within the largest ends of the slots 11 and the hub shell 5 then rotated to the position shown in Figure 5 for engaging the reduced ends of the nuts 8 in the narrow portion of the slots 11. This will also result in alinement of the larger ends of the slots 11 with the recesses 10 as shown in Figure 5.

The locking plate 14 which is carried by the hub shell 5 through the medium of the aforementioned headed studs 16 in a manner to be free to move axially toward or away from the shell member 5 or to rotate toward the right or toward the left relative to the hub shell 5, is first rotated to a position to aline the openings 15 therein with the bolts 8 and the studs 17 thereon with the alined pockets 10 and enlarged ends of slots 11. When such alinement is obtained the plate 14 is then moved inwardly into contact with the adjacent portion of the hub shell 5, the hexagonal portions of the nuts 8 being accommodated in the openings 15 and the studs 17 being accommodated in the recesses 10.

Upon positioning of the parts as just stated nuts 22 will aline with the pins 20 and the movement of the locking plate 14 inwardly into locking position is accomplished by threading the nuts 22 home on the pins 20 as is thought to be apparent.

It will thus be seen that the parts are now all locked in assembled position and the mounting of the wheel is completed. Separation of the assembled parts is effectively prevented by the engagement of the dogs 28 with the ratchet teeth 27 on the nuts 22 as thought to be apparent, such dog and ratchet means serving to effectively prevent unscrewing of the nuts 22 until the dogs are positively moved out of engagement with the ratchet teeth as is also thought to be apparent.

Manifestly to demount the wheel the operation above described is reversed.

Having thus described my invention, what I claim as new is:

1. In a wheel assembly of the character described having an inner fixed hub structure and an outer hub shell mounted on the inner hub structure, an annular plate on the side of the outer shell opposite to the inner hub structure and movable to secure the shell in place on the inner hub structure, threaded studs projecting from said inner hub structure and through said hub shell, and said plate having openings through which said studs extend, nuts threadedly engaging said studs and engaging the plate to move the latter into position for securing the shell in place, each nut being provided on its circumference with ratchet teeth, and a dog pivotally mounted on the plate and engageable with the ratchet teeth to secure the nut against retrograde movement.

2. In a wheel assembly, and in combination, a hub structure having sockets therein, a demountable wheel having a hub shell cooperable with the hub structure for mounting the wheel thereon, bolts arranged in an annular series projecting outwardly from the hub structure, nuts on the bolts having reduced inner ends, said hub shell having an annular series of keyhole slots for cooperation with the nuts for mounting and demounting the wheel, a locking ring having an annular series of lugs projecting from one side thereof into and filling the larger ends of the keyhole slots, threaded pins projecting from said hub structure and through said hub shell, and said locking ring having arcuate slots through which said threaded pins extend, nuts threadedly engaged with said pins and adapted to be screwed home against said locking ring for securing the lugs thereof within said larger ends of the keyhole slots, said nuts being provided with ratchet teeth on their respective peripheries, and spring pressed dogs mounted on the locking ring and engageable with the ratchet teeth of the nuts to secure the latter against retrograde movement.

3. In a wheel assembly, and in combination, a hub structure having sockets therein together with bolts arranged adjacent said sockets and projecting outwardly from the hub structure, nuts on the bolts having reduced ends, a demountable wheel having a hub shell provided with keyhole slots cooperable with the nuts in mounting and demounting the wheel, a locking ring provided with a plurality of lugs projecting from one side thereof through the larger ends of the keyhole slots and engaging in the sockets of the hub structure, means for mounting the locking ring on the hub shell for axial movement relative to the shell and also for rotative movement relative to the shell, and threaded pins projecting from said hub structure and through said hub shell, said pins extending through arcuate slots in said locking ring, a plurality of studs swivelly mounted on the locking ring threadedly engaging said pins to cooperate with the pins for forcing the locking ring into final position, and interengaging means on said locking ring and said nuts for securing the latter against retrograde movement.

4. In a wheel assembly, and in combination, a hub structure having sockets therein together with bolts arranged adjacent said sockets and projecting outwardly from the hub structure, nuts on the bolts having reduced ends, a demountable wheel having a hub shell provided with keyhole slots cooperable with the nuts in mounting and demounting the wheel, a locking ring provided with a plurality of lugs projecting from one side thereof through the larger ends of the keyhole slots and engaging in the sockets of the hub structure, said hub structure also having threaded pins projecting outwardly therefrom and through said hub shell, and said locking ring having arcuate slots through which said pins extend, nuts threadedly engaged with said pins, and swivel means connecting said nuts with the locking rings, said nuts being provided on their respective peripheries with ratchet teeth and pivoted dogs on the locking ring engageable with the ratchet teeth for securing the swiveled nuts against retrograde movement.

5. In a wheel assembly, and in combination, a hub structure having sockets therein together with bolts arranged adjacent said sockets and projecting outwardly from the hub structure, nuts on the bolts having reduced ends, a demountable wheel having a hub shell provided with keyhole slots cooperable with the nuts in mounting and demounting the wheel, a locking ring provided with a plurality of lugs projecting from one side thereof through the larger ends of the keyhole slots and engaging in the sockets of the hub structure, said hub structure also having threaded pins projecting outwardly therefrom and through said hub shell, and said locking ring having arcuate slots through which said pins extend, nuts threadedly engaged with said pins, and swivel means connecting said nuts with the locking ring, said nuts respectively being provided on their respective peripheries with ratchet teeth and pivoted dogs on the locking ring engageable with the ratchet teeth for securing the swiveled nuts against retrograde movement, spring means normally urging said dogs into engagement with the ratchet teeth, and latch means on the locking ring for releasably securing said dogs in a position free of engagement with the ratchet teeth.

LOUIS B. McGUIGAN.